(12) United States Patent
Liu et al.

(10) Patent No.: US 12,117,423 B2
(45) Date of Patent: Oct. 15, 2024

(54) ROCK STRATUM GROUTING WATER BLOCKING TEST DEVICE AND METHOD UNDER MINING COUPLING CONDITION

(71) Applicant: SHANDONG UNIVERSITY OF SCIENCE AND TECHNOLOGY, Qingdao (CN)

(72) Inventors: Weitao Liu, Qingdao (CN); Haifeng Wu, Qingdao (CN); Xiangxi Meng, Qingdao (CN); Jiyuan Zhao, Qingdao (CN); Yanhui Du, Qingdao (CN); Lifu Pang, Qingdao (CN); Mengke Han, Qingdao (CN); Yaohua Li, Qingdao (CN); Weiguo Song, Qingdao (CN); Hao Li, Qingdao (CN)

(73) Assignee: SHANDONG UNIVERSITY OF SCIENCE AND TECHNOLOGY, Qingdao (CN)

( * ) Notice: Subject to any disclaimer, the term of this patent is extended or adjusted under 35 U.S.C. 154(b) by 0 days.

(21) Appl. No.: 18/691,990

(22) PCT Filed: Apr. 10, 2023

(86) PCT No.: PCT/CN2023/087286
§ 371 (c)(1),
(2) Date: Mar. 14, 2024

(87) PCT Pub. No.: WO2024/077900
PCT Pub. Date: Apr. 18, 2024

(65) Prior Publication Data
US 2024/0264059 A1    Aug. 8, 2024

(30) Foreign Application Priority Data
Oct. 14, 2022  (CN) .......................... 202211256564.2

(51) Int. Cl.
*G01N 3/56* (2006.01)

(52) U.S. Cl.
CPC ..... *G01N 3/565* (2013.01); *G01N 2203/0226* (2013.01); *G01N 2203/0242* (2013.01);
(Continued)

(58) Field of Classification Search
CPC ... G01N 2203/0226; G01N 2203/0242; G01N 2203/0284; G01N 2203/0676; G01N 2203/0694; G01N 3/565
(Continued)

(56) References Cited

FOREIGN PATENT DOCUMENTS

| CN | 109212163 A | * | 1/2019 | ............ G01N 33/24 |
| CN | 114720285 A | * | 7/2022 | ............... G01N 3/02 |
| CN | 115524261 B | | 12/2022 | |

OTHER PUBLICATIONS

Translation of CN-114720285-A (Year: 2022).*
(Continued)

*Primary Examiner* — Nathaniel T Woodward
(74) *Attorney, Agent, or Firm* — Getech Law LLC; Jun Ye

(57) ABSTRACT

The disclosure provides a rock stratum grouting water blocking test device and method under a mining coupling condition, and relates to the technical field of permeability testing. The device includes a solution box, a test box, a pressing plate replacement box, a grouting pump, a recovery pool and a water pump, the solution box is connected with the test box through a liquid injection pipe, the bottom of the test box is connected with the pressing plate replacement box, the pressing plate replacement box is connected with a bottom plate, and the bottom plate is connected with a control panel. The device can be used for testing the influence of the single-factor or multi-factor coupling action of temperature, water quality, water pressure, water flow and grouting pressure on the grouting effect.

5 Claims, 4 Drawing Sheets

(52) U.S. Cl.
CPC ............... *G01N 2203/0284* (2013.01); *G01N 2203/0676* (2013.01); *G01N 2203/0694* (2013.01)

(58) Field of Classification Search
USPC .......................................................... 73/818
See application file for complete search history.

(56) References Cited

OTHER PUBLICATIONS

Translation of CN-109212163-A (Year: 2019).*
CN 202211256564.2, First Office Action, mailed Jun. 12, 2023, 12 pages. (with English translation).
CN 202211256564.2, Notice of Allowance, mailed Aug. 28, 2023, 12 pages. (with English translation).
Dingyang Zhang, "Research on the Multi field Coupling Mechanism of Dynamic Water Grouting Diffusion in Fractured Rock Mass", Dec. 31, 2018, 7 pages. (with English translation).

* cited by examiner

ROCK STRATUM GROUTING WATER BLOCKING TEST DEVICE AND METHOD UNDER MINING COUPLING CONDITION

CROSS REFERENCE OF RELATED APPLICATION

The present application is a 371 of international Application PCT/CN2023/087286, filed Apr. 10, 2023, which claims priority to Chinese Patent Application No. 202211256564.2 filed on Oct. 14, 2022. The contents of the applications are incorporated herein by reference in their entireties.

TECHNICAL FIELD

The present disclosure relates to the technical field of permeability testing, and more particularly, to a rock stratum grouting water blocking test device and method under a mining coupling condition.

BACKGROUND

With the increase of the mining depth, the environment of rock masses in deep rock strata is becoming more and more complex, and microcracks are easier to form inside, and microcracks are easier to penetrate each other, which increases the probability of water inrush disasters and brings serious threats to coal mine safety production. Grouting water blocking technology is one of the effective measures to prevent and control mine water disasters and ensure safe mining.

According to the existing technical achievements, the effect of grouting is affected by many factors. At present, the research on the influencing factors of grouting effect generally focuses on the research of water pressure and flow rate, while the test on the performance of a grouting material does not consider the influence of temperature and water quality coupling on its mechanical properties and the influence of temperature, fracture width, angle and roughness coupling on the diffusion law of the grouting material, nor does it consider the comprehensive influence of temperature, water quality, grouting pressure, water pressure and water flow on the grouting effect. Therefore, on the basis of the prior art, it is necessary to test the performance of the grouting material and the effect of grouting water blocking under the coupling of multiple factors, so as to provide reliable basis for safe mining of coal mines.

SUMMARY

In order to test the influence of the single-factor or multi-factor coupling of temperature, water quality, fracture width, angle and roughness on the performance of the grouting material and test the influence of the single-factor or multi-factor coupling of temperature, water quality, water pressure, water flow and grouting pressure on the grouting effect, and in the test process, to better control the factors such as temperature, water pressure and flow rate of water injection, temperature in the box, ionic solution concentration, leaching area, grouting pressure, water pressure and water flow rate, the disclosure provides a rock stratum grouting water blocking test device and method under a mining coupling condition, and the specific technical solution is as follows:

A rock stratum grouting water blocking test device under a mining coupling condition, including a solution box, a test box, a pressing plate replacement box, a grouting pump, a recovery pool and a water pump, wherein the solution box is connected with the test box through a liquid injection pipe, the bottom of the test box is connected with the pressing plate replacement box, the pressing plate replacement box is connected with a bottom plate, and the bottom plate is connected with a control panel; longitudinal pressing plates, a transverse pressing plate, and a temperature sensor, a weight sensor and a stress sensor are provided inside the test box; the longitudinal pressing plate at the bottom of the test box is provided with fractures and scales, a top of the test box is provided with a cover plate, and the cover plate is provided with a plurality of liquid injection holes, one or more of liquid injection holes are connected with the solution box through the liquid injection pipe; a left side panel of the test box is provided with a water drain hole and a plurality of grouting holes, and a right side panel is provided with a plurality of water injection holes, and the water injection holes are connected with the water pump through a water injection pipe; the water drain hole is connected with a recovery pool through a water drain pipe, and one or more of grouting holes are connected with the grouting pump through a grouting pipe.

Preferably, a pressure gauge is installed on the grouting pipe, each of the water drain pipe and the water injection pipe is provided with a water pressure gauge and a flow meter; each of the liquid injection pipe, the grouting pipe, the water drain pipe, and the water injection pipe is provided with a valve.

Preferably, the longitudinal pressing plate is provided with a plurality of opening holes, and the positions of the opening hole are opposite to the positions of the liquid injection holes in the cover plate; the middle of the cover plate is provided with a hydraulic prop which connects the cover plate with the longitudinal pressing plate.

Preferably, the longitudinal pressing plate is rotated by means of a roller, a width of the fracture is adjusted to be 1-3.5 mm, an angle of the fracture is adjusted to be 0°-50°, and a roughness factor of the fracture is adjusted to be JRC=8-10, 14-16, 18-20.

More preferably, the weight sensor is arranged at a central position of the longitudinal pressing plate at the bottom of the test box, the longitudinal pressing plate is connected with a rotatable roller via a connecting bolt, the rotatable roller is provided with a groove; the temperature sensor is disposed inside the test box.

More preferably, the test box and the pressing plate replacement box are peripherally coated with an insulation layer, and the pressing plate replacement box is provided with a box door.

A diffusion test method for a grouting material, using the above rock stratum grouting water blocking test device under the mining coupling condition, including the steps of:

S1. preparing a cement-based inorganic grouting slurry, and stirring to be uniform;

S2. removing the longitudinal pressing plate inside the test box, mounting a stainless steel glass plate;

S3. after plugging a part of the grouting holes with corks, using the grouting pump to inject the slurry into the test box via the grouting holes through the grouting pipe;

S4. stopping grouting when the slurry is level with the fractures of the longitudinal pressing plate on the top of the pressing plate replacement box;

S5. after heating the test box to a set temperature, opening the valve on the water drain pipe, rotating the longitudinal pressing plate above the pressing plate replacement box, and after rotating to a set angle, observing the diffusion law of the grouting material;

S6. opening the pressing plate replacement box and cleaning the longitudinal pressing plate; and S7. replacing the longitudinal pressing plate above the pressing plate replacement box, setting the temperature, the fracture angle, the fracture width, and the fracture roughness, and repeating the steps S1-S6 to observe the diffusion law of the grouting material, respectively.

A method of measuring the strength of a grouting material using the above rock stratum grouting water blocking test device under the mining coupling condition, including the steps of:

S1. preparing a cement-based inorganic grouting slurry, and stirring to be uniform;

S2. after setting the fracture angle, the fracture width, and the fracture roughness, and plugging a part of the grouting holes with corks, using the grouting pump to inject the slurry into the test box in layers via the grouting holes through the grouting pipe, and tamping each layer after grouting is completed;

S3. stopping grouting when the amount of the injected slurry is greater than three quarters of the volume of the test box, keeping the valves on the water drain pipe and the water injection pipe in a closed state;

S4. preparing a solution containing $Cl^-$ or $SO_4^{2-}$, recording the concentration value after pouring the solution into the solution box;

S5. after initial setting of the slurry and after plugging a part of the liquid injection holes with corks, opening the valve on one or more of liquid injection pipes, and performing a partial or whole leaching experiment;

S6. after adjusting the temperature of the test box to a set temperature, turning on the transverse pressing plate and the longitudinal pressing plate; and S7. analyzing the effect of temperature and water quality on the strength of the grouting material.

A method for testing the dispersion resistance of a grouting material using the above rock stratum grouting water blocking test device under the mining coupling condition, including the steps of:

S1. preparing a cement-based inorganic grouting slurry, and stirring to be uniform;

S2. after setting the fracture angle, the fracture width, and the fracture roughness, and plugging a part of the grouting holes with corks, using the grouting pump to inject the slurry into the test box in layers via the grouting holes through the grouting pipe, and tamping each layer after grouting is completed;

S3. stopping grouting when the amount of the injected slurry is greater than three quarters of the volume of the test box, keeping the valves on the water drain pipe and the water injection pipe in a closed state;

S4. preparing a solution containing $Cl^-$ or $SO_4^{2-}$, recording the concentration value after pouring the solution into the solution box;

S5. recording the monitored value of the weight sensor after initial setting of the slurry;

S6. after plugging a part of the water injection holes with corks, recording the values of the water pressure gauge and the flow meter, and adjusting the temperature of the test box to a set temperature;

S7. opening the valve of the water drain pipe, recording the monitored value of the weight sensor after 30 min; and S8. calculating a consolidation retention rate to evaluate the dispersion resistance of the material.

A rock stratum grouting water blocking test method under a mining coupling condition, using the above rock stratum grouting water blocking test device under the mining coupling condition, including the steps of:

S1. loading crushed rocks into the test box, the amount of rocks being greater than three quarters of the volume of the test box;

S2. preparing a cement-based inorganic grouting slurry, and stirring to be uniform, preparing a solution containing $Cl^-$ or $SO_4^{2-}$, recording the concentration value after pouring the solution into the solution box;

S3. opening the valve on the water drain pipe, injecting water into the test box through the water pump after setting the water pressure, keeping the flow rate of the water injection pipe unchanged, and controlling the temperature of the test box;

S3. opening the valve on the liquid injection pipe, and at the same time opening the valve on the grouting pipe to inject the slurry into the test box until the water drain pipe stops draining, closing the valves on the liquid injection pipe, the grouting pipe and the water injection pipe; and S4. turning on the transverse pressing plate and the longitudinal pressing plate after slurry setting to test strength and record monitoring data, and analyzing the effect of temperature, water quality, grouting pressure, water pressure and water flow on grouting water blocking.

The beneficial effects of the rock stratum grouting water blocking test device and method under the mining coupling condition provided by the present disclosure are that the test device realizes the grouting water blocking effect test of different types and sizes of crushed rocks, and can simulate the difference between the grouting water blocking effects of different types of crushed rocks in the mine rock stratum, so as to find more suitable grouting materials according to the rock types. When the device is used to test, the influence of temperature and water quality coupling on mechanical properties of the grouting material and the influence of temperature, fracture width, angle and roughness coupling on the diffusion law of the grouting material are studied by configuring different concentrations of ionic solution, adjusting the temperature in the test box and replacing and rotating the longitudinal pressing plate at the top of the pressing plate replacement box. In addition, the device can also control the temperature, water pressure and water flow rate of injected water, so as to facilitate the study on dispersion resistance of the grouting material. By controlling the temperature, ionic solution concentration and leaching area, grouting pressure, water pressure and water flow rate in the test box, it is convenient to study the influence of temperature, water quality, grouting pressure, water pressure and water flow rate on the grouting effect

Figure 1:
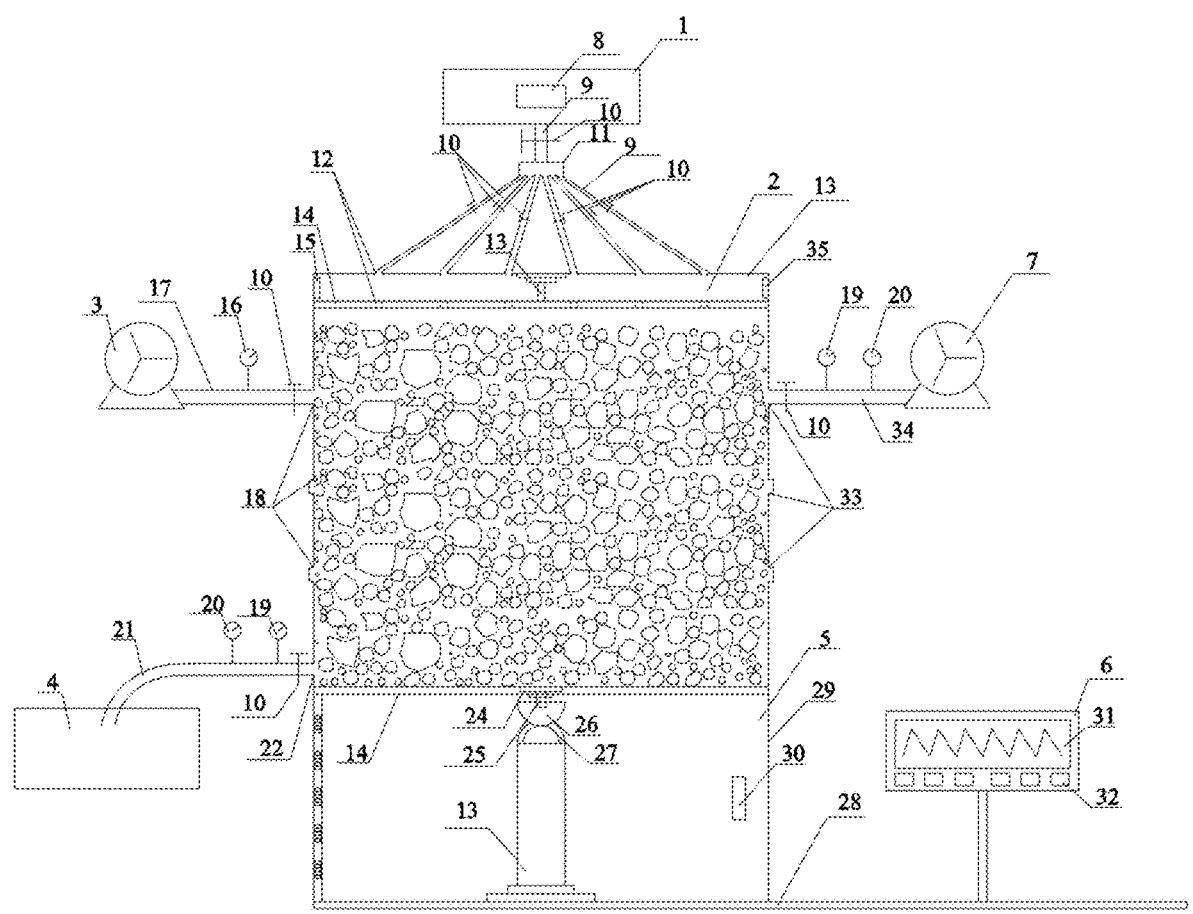
FIG. 1 is a schematic diagram illustrating the structure of a rock stratum grouting water blocking test device under a mining coupling condition.

In the drawings: 1—solution box, 2—test box, 3—grouting pump, 4—recovery pool, 5—pressure plate replacement box, 6—control panel, 7—water pump, 8—concentration sensor, 9—liquid injection pipe, 10—valve, 11—adapter, 12—liquid injection hole, 13—hydraulic prop, 14—longitudinal pressing plate, 15—temperature sensor, 16—pressure gauge, 17—grouting pipe, 18—grouting hole, 19—water pressure gauge, 20—flow meter, 21—water drain pipe, 22—water drain hole, 23—transverse pressing plate, 24—weight sensor, 25—connecting bolt, 26—rotatable roller, 27—groove, 28—bottom plate, 29—box door, 30—handle, 31—liquid crystal display screen, 32—control button, 33—water injection hole, 34—water injection pipe, 35—stress sensor.

DETAILED DESCRIPTION

Figure 2:
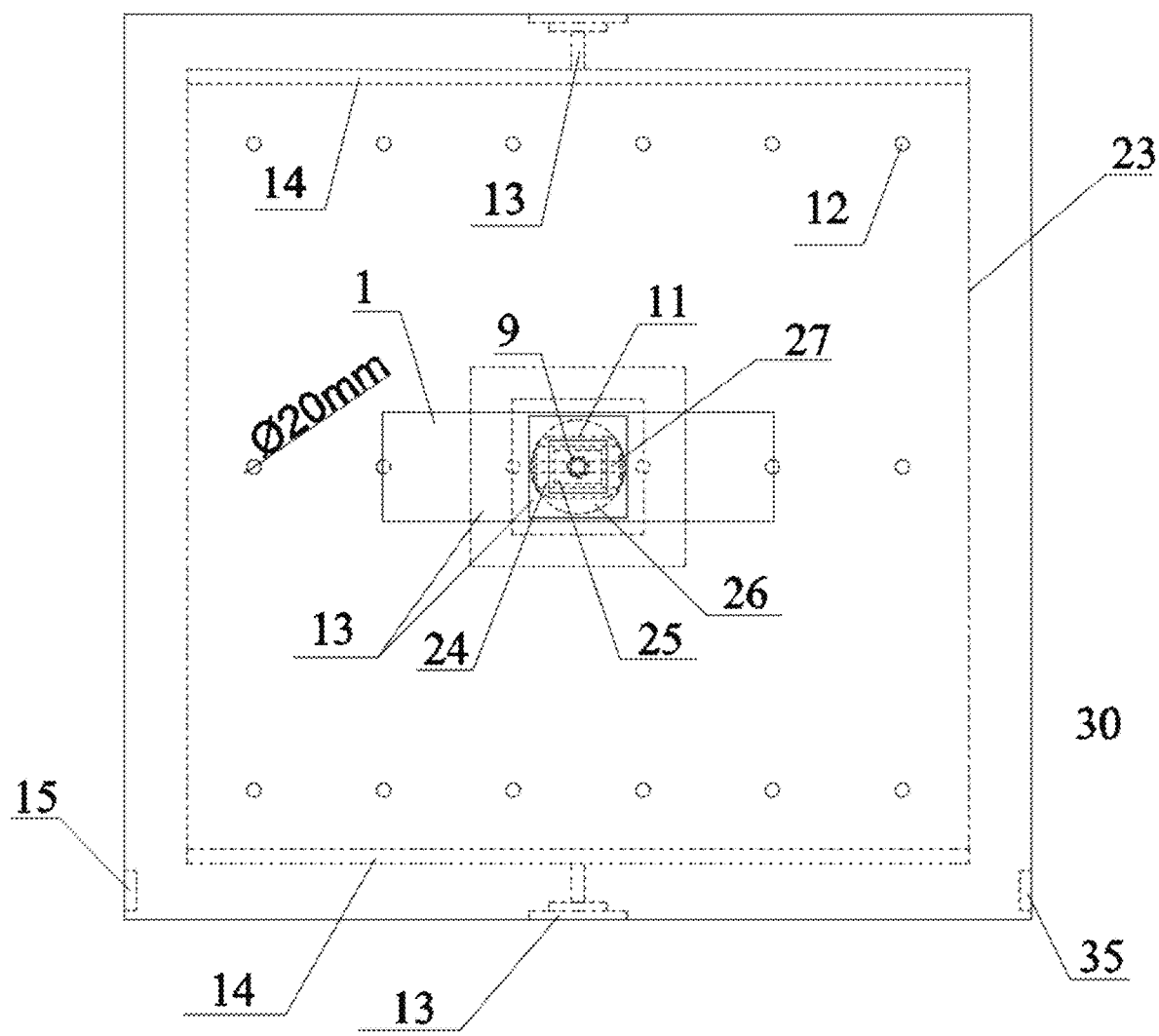
FIG. 2 is a top view of the interior of the test box and the pressing plate replacement box.
Figure 3:
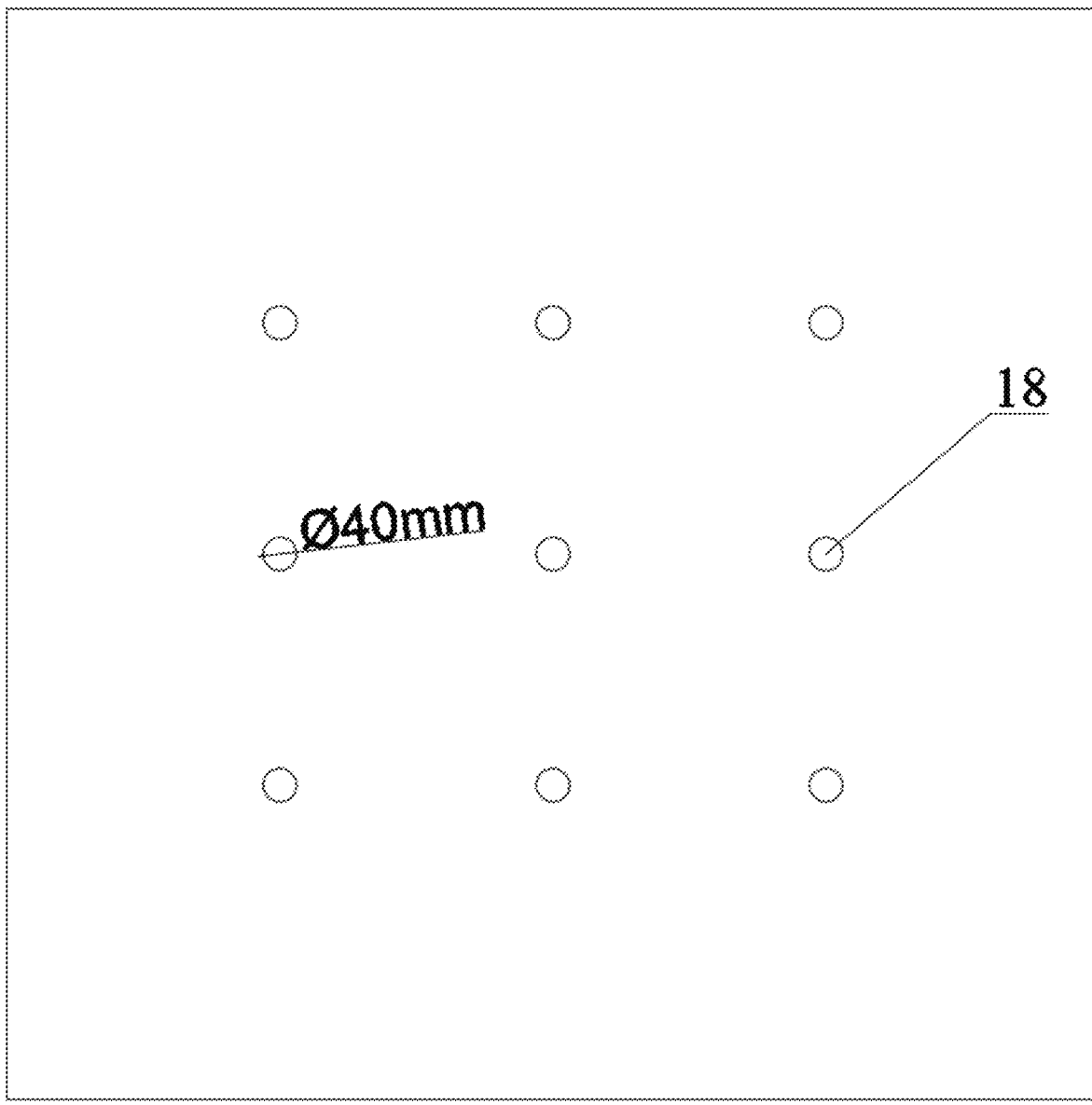
FIG. 3 is a schematic diagram illustrating the structure of a left side panel.
Figure 4:
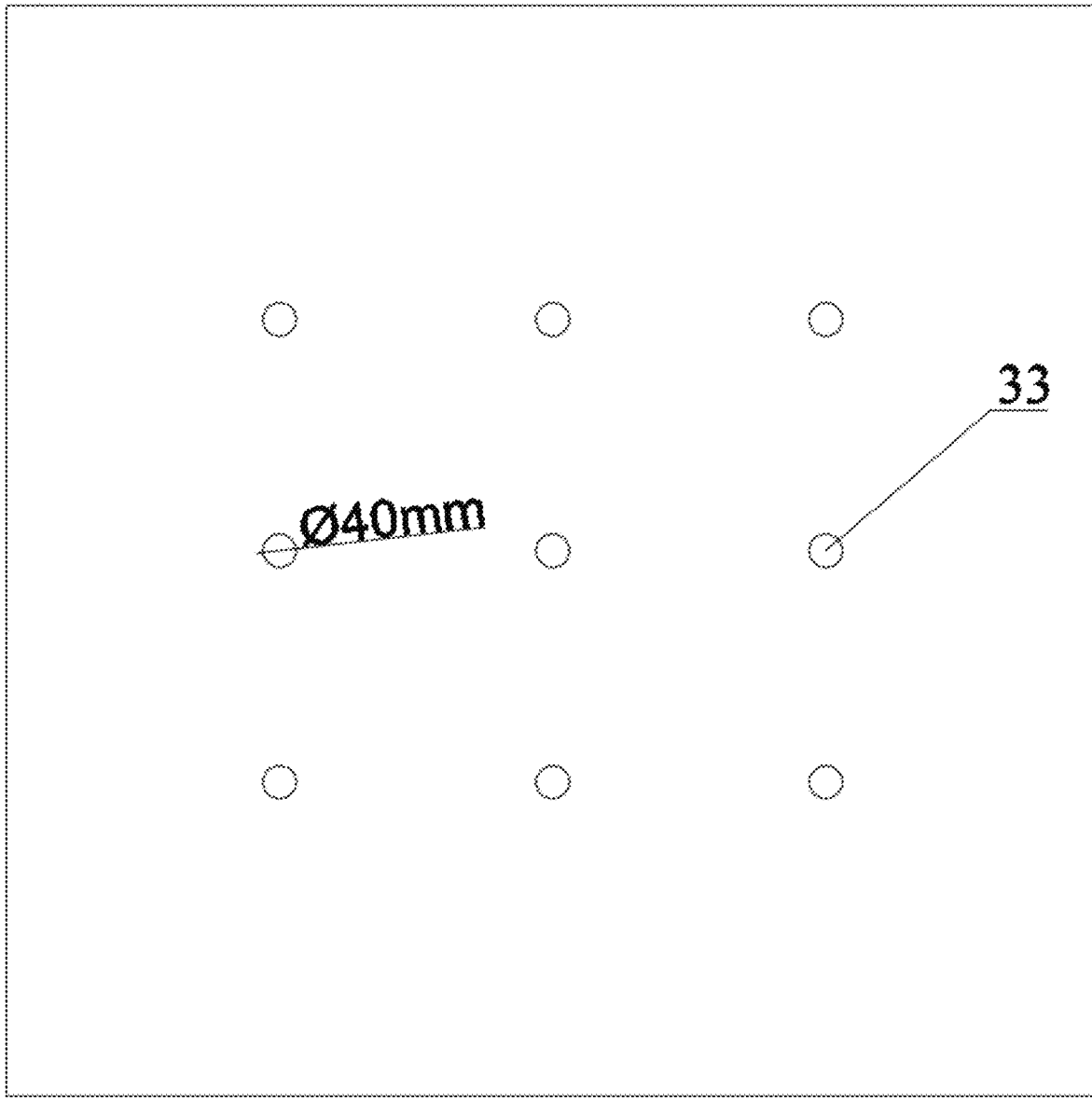
FIG. 4 is a schematic diagram illustrating the structure of a right side panel.

Referring now to FIGS. 1-4, an embodiment of a rock stratum grouting water blocking test device and method under a mining coupling condition provided by the present disclosure will be described.

A rock stratum grouting water blocking test device under a mining coupling condition includes a solution box 1, a test box 2, a pressing plate replacement box 5, a grouting pump 3, a recovery pool 4 and a water pump 7, the solution box 1 is used for preparing solutions of different concentrations, and the measurement accuracy thereof is between 0.001-0.01%; the test box 2 and the pressing plate replacement box 5 cooperate to perform a grouting test, the single-factor and multi-factor test of the grouting material and the grouting effect can be performed, and the grouting pump 3 and the water pump 7 control parameters of water injection and grouting during the test. The solution box 1 is connected with the test box through a liquid injection pipe, the bottom of the test box 2 is connected with the pressing plate replacement box, and the pressing plate replacement box 5 is connected with a bottom plate, and the bottom plate is connected with a control panel. In the test box 2, there is provided a longitudinal pressing plate 14, a transverse pressing plate 23, and a temperature sensor 15, a weight sensor 24 and a stress sensor 35. The longitudinal pressing plate at the bottom of the test box 2 is provided with fractures and scales, and the longitudinal pressing plate 14 is connected with the pressing plate replacement box. The top of the test box 2 is provided with a cover plate, the cover plate is provided with a plurality of liquid injection holes 12, one or more liquid injection holes are connected with the solution box 1 through a liquid injection pipe 9, the specific connection situation is determined according to test needs, and the position of disconnection can be plugged with a cork. The left side panel of the test box 2 is provided with a water drain hole and a plurality of grouting holes 12, and the right side panel is provided with a plurality of water injection holes 33, which are connected with the water pump 7 through a water injection pipe 34. The water drain hole 22 is connected with the recovery pool 4 through the water drain pipe 21, and one or more of grouting holes are connected with the grouting pump 3 through the grouting pipe 17. The specific connection is determined according to test needs, and the position of disconnection can be plugged with a cork.

A pressure gauge is installed on the grouting pipe 17 to visually reflect the pressure magnitude of the injected slurry, a water pressure gauge and a flow meter are installed on each of the water drain pipe 21 and the water injection pipe 34, and the water pressure gauge 19 and the flow meter 20 on the water injection pipe 34 can visually reflect the magnitude of the injected water pressure and flow rate to study the influence of the grouting pressure, the water pressure and the water flow rate on the grouting effect; the water pressure gauge and the flow meter on the water drain pipe 21 can evaluate the grouting water blocking effect according to readings. The liquid injection pipe 9, the grouting pipe 17, the water drain pipe 21, and the water injection pipe 34 are each provided with a valve through which the range of water injection and grouting can be controlled. The weight sensor 24 is arranged at the central position of the longitudinal pressing plate at the bottom of the test box. The temperature sensor 15 is arranged in the test box 2 which controls the temperature in the range of 15-65° C. In the embodiment, the water pressure controlled by the water pump is taken to be 0.1-1.1 MPa, the grouting pressure of the grouting pump is taken to be 0.2-1.2 MPa, and the water flow rate is taken to be 4-14 m$^3$/s.

The longitudinal pressing plate 14 is connected with a rotatable roller 26, which is provided with a groove, by means of a connecting bolt 25. The loading speed of the longitudinal pressing plate 14 and the transverse pressing plate 23 is 0.2 kN/s. The longitudinal pressing plate 14 is detachably mounted, wherein the longitudinal pressing plate 14 is provided with a plurality of openings in positions opposite to the positions of the water injection holes 12 in the cover plate. A hydraulic prop 13 is provided in the middle of the cover plate, which connects the cover plate and the longitudinal pressing plate. Fractures and scales are provided on the longitudinal pressing plate 14. The longitudinal pressing plate at the top of the pressing plate replacement box can be rotated by a roller, a width of the fracture is adjusted to be 1-3.5 mm, an angle of the fracture is adjusted to be 0°-50°, and a roughness factor of the fracture is adjusted to be JRC=8-10, 14-16, 18-20 to study the influence of the fracture width, angle and roughness on the diffusion law of the grouting material.

The test box 2 and the pressing plate replacement box 5 are peripherally covered with an insulation layer, and the pressing plate replacement box 5 is provided with a box door 29, and a handle 30 may also be provided on the box door. The length*width*height of the test box in this embodiment is 400*400*400 mm, each side of the test box 2 is made of stainless steel material, the top of the test box 2 is provided with a movable stainless steel cover plate, the cover plate is connected with the test box 2 through a strong magnetic strip, and the test box 2 is surrounded with an insulation layer to realize the sealing of the test box 2. The size of the liquid injection hole 12 in the cover plate of the test box 2 is Ø20 mm, there are 18 holes in total, and the holes are uniformly arranged in three rows and six columns on the cover plate. The size of the grouting hole 18 in the left side panel of the test box 2 is Ø40 mm, there are 9 holes in total, and are uniformly arranged in three rows and three columns on the left side panel of the test box 2. The water injection holes 33 on the right side panel of the test box 2 is Ø40 mm, there are 9 holes in total and are uniformly arranged in three rows and three columns on the right side panel of the test box 2.

In addition, a single-chip microcomputer is provided inside the control panel 6 for real-time control, a liquid crystal display screen 31 and control buttons 32 are provided on the front side of the control panel 6, and the single-chip microcomputer is connected with the concentration sensor 8, the hydraulic prop 13, the temperature sensor 15, the weight sensor 24, the roller 26, the liquid crystal display screen 31, the control buttons 32 and the stress sensor 35.

A diffusion test method for a grouting material is used for testing the diffusion law of a grouting material. The method uses the rock stratum grouting water blocking test device under the mining coupling condition, and includes the steps of:
- S1. a cement-based inorganic grouting slurry is prepared and stirred to be uniform, and a stirrer can be selected according to needs;
- S2. the longitudinal pressing plate inside the test box is removed, and a stainless steel glass plate is mounted;
- S3. after a part of the grouting holes are plugged with corks, the grouting pump is used to inject the slurry into the test box via the grouting holes through the grouting pipe;
- S4. grouting is stopped when the slurry is level with the fractures of the longitudinal pressing plate on the top of the pressing plate replacement box;
- S5. after the test box is heated to a set temperature, the valve on the water drain pipe is opened, the longitudinal pressing plate above the pressing plate replacement box is rotated, and after the longitudinal pressing plate is rotated to a set angle, the diffusion law of the grouting material is observed;
- S6. the pressing plate replacement box is opened and the longitudinal pressing plate is cleaned; and
- S7. the longitudinal pressing plate above the pressing plate replacement box is replaced, the temperature, the fracture angle, the fracture width, and the fracture roughness are set, and the steps S1-S6 are repeated to observe the diffusion law of the grouting material, respectively.

Wherein, the specific operations of the test device are that the cover plate is opened, the longitudinal pressing plate 14 inside the test box 2 is taken out, the stainless steel glass plate is installed, and the stainless steel glass plate is butt-sealed with the test box 2 with a sealing strip; simultaneously the slurry is injected into the test box 2 through the grouting pipe 17 and the grouting holes 18 by means of the grouting pump 3, the unused grouting holes 18 are plugged with corks, grouting is stopped when the slurry is level with the fractures of the longitudinal pressing plate 14 on the top of the pressing plate replacement box 5; the test box 2 is subjected to a temperature increase, and the temperature increase is stopped after a set temperature is reached; the valve 10 on the recovery pool 4 is opened, the longitudinal pressing plate 14 on the top of the pressing plate replacement box 5 is rotated, and after the longitudinal pressing plate 14 is rotated to a set angle, rotation is stopped, and the diffusion law of the grouting material at different temperatures and different fracture angles is visually observed and recorded; the longitudinal pressing plate 14 at the top of the pressing plate replacement box 5 can be replaced according to a set fracture width and roughness, so that the diffusion law of the grouting material at different temperatures, at different fracture angles and widths and under different roughness can be visually observed and recorded, so that a quantitative study of the diffusion law of the grouting material can be achieved. After completion of the test, the stainless steel glass plate is opened, the longitudinal pressing plate 14 on the top of the pressing plate replacement box 5 is cleaned, and the longitudinal pressing plate 14 is installed, the box door 29 is closed, and the box door 29 is tightly connected with the pressing plate replacement box 5 by means of a strong magnetic strip, and the connection portion is covered with an insulation layer.

A method of measuring the strength of a grouting material is used for testing the strength of the grouting material. The method uses the rock stratum grouting water blocking test device under the mining coupling condition, and includes the steps of:
- S1. a cement-based inorganic grouting slurry is prepared and stirred to be uniform;
- S2. after the fracture angle, the fracture width, and the fracture roughness are set, and a part of the grouting holes are plugged with corks, the grouting pump is used to inject the slurry into the test box in layers via the grouting holes through the grouting pipe, and each layer is tamped after grouting is completed;
- S3. grouting is stopped when the amount of the injected slurry is greater than three quarters of the volume of the test box, the valves on the water drain pipe and the water injection pipe are kept in a closed state;
- S4. a solution containing $Cl^-$ or $SO_4^{2-}$ is prepared, and the concentration value is recorded after the solution is poured into the solution box;
- S5. after initial setting of the slurry and after a part of the liquid injection holes are plugged with corks, the valve on one or more of liquid injection pipes is opened, and a partial or whole leaching experiment is performed;
- S6. after the temperature of the test box is adjusted to a set temperature, the transverse pressing plate and the longitudinal pressing plate are turned on; and S7. the effect of temperature and water quality on the strength of the grouting material is analyzed.

Wherein, the specific operations of the test device are that, the fracture angle, width and roughness are controlled quantitatively, and at the same time, the grouting pump 3 is used to inject the slurry into the test box 2 in layers via the grouting holes 18 through the grouting pipe 17, and each layer is tamped after grouting is completed, and the unused grouting holes 18 are plugged with corks, grouting is stopped when the amount of the injected slurry is greater than three quarters of the volume of the test box 2, the valves 10 on the water drain pipe 21 and the water injection pipe 34 are kept in a closed state; a solution of $Cl^-$ at 0-2.50 mol/L or $SO_4^{2-}$ at 0-2.50 mol/L is prepared, the solution is poured into the solution box 1, the concentration value is recorded; after the initial setting of the slurry, the valve 10 on the one or more liquid injection pipes 9 is opened, the partial or whole leaching test is performed, and the unused liquid injection holes 12 are plugged; at the same time, the test box 2 is heated to a set temperature, and then the transverse pressing plate 23 and the longitudinal pressing plate 14 are opened, and the data are recorded, so that the law of variation in strength of the grouting material can be evaluated qualitatively or quantitatively under the temperature and water quality coupling condition. After completion of the test, the solution box 1 is cleaned, the cover plate is opened, and the test box 2 is cleaned, and after the test box 2 is dried, the test box 2 is tightly connected with the cover plate by means of a strong magnetic stripe, and the connection portion is covered with an insulation layer.

A method for testing the dispersion resistance of a grouting material using the rock stratum grouting water blocking test device under the mining coupling condition, including the steps of:
- S1. a cement-based inorganic grouting slurry is prepared and stirred to be uniform;
- S2. after the fracture angle, the fracture width, and the fracture roughness are set, and a part of the grouting holes are plugged with corks, the grouting pump is used to inject the slurry into the test box in layers via the grouting holes through the grouting pipe, and each layer is tamped after grouting is completed;

S3. grouting is stopped when the amount of the injected slurry is greater than three quarters of the volume of the test box, the valves on the water drain pipe and the water injection pipe are kept in a closed state;

S4. a solution containing $Cl^-$ or $SO_4^{2-}$ is prepared, the concentration value is recorded after the solution is poured into the solution box;

S5. the monitored value of the weight sensor is recorded after initial setting of the slurry;

S6. after a part of the water injection holes are plugged with corks, the values of the water pressure gauge and the flow meter are recorded, and the temperature of the test box is adjusted to a set temperature;

S7. the valve of the water drain pipe is opened, the monitored value of the weight sensor is recorded after 30 min; and S8. a consolidation retention rate is calculated to evaluate the dispersion resistance of the material.

Wherein, the specific operations of the test device are that the solution of $Cl^-$ at 0-2.50 mol/L or $SO_4^{2-}$ at 0-2.50 mol/L is quantitatively controlled, the fracture angle, width and roughness are unchanged, and after the slurry has set, the value appearing at the weight sensor 24 is recorded; the water injection pipe 34 is connected to the water injection holes 33 on the test box 2, and the unused water injection holes 33 are plugged with corks, the values of the water pressure gauge 19 and the flow meter 20 are recorded, the test box 2 is subjected to temperature increase, and the temperature increase is stopped after the set temperature is reached, and the valve 10 of the recovery pool 4 is opened at the same time. After 30 min, the value of the weight sensor 24 is recorded, and the consolidation retention rate is calculated by the weight difference to evaluate the dispersion resistance of the slurry material. The larger the consolidation retention rate, the better the dispersion resistance of the slurry material.

A rock stratum grouting water blocking test method under a mining coupling condition, using the rock stratum grouting water blocking test device under the mining coupling condition, including the steps of:

S1. crushed rocks are loaded into the test box, the amount of rocks being greater than three quarters of the volume of the test box;

S2. a cement-based inorganic grouting slurry is prepared and stirred to be uniform, a solution containing $Cl^-$ or $SO_4^{2-}$ is prepared, and the concentration value is recorded after the solution is poured into the solution box;

S3. the valve on the water drain pipe is opened, water is injected into the test box through the water pump after the water pressure is set, the flow rate of the water injection pipe is kept unchanged, and the temperature of the test box is controlled;

S3. the valve on the liquid injection pipe is opened, and at the same time the valve on the grouting pipe is opened to inject the slurry into the test box until the water drain pipe stops draining, the valves on the liquid injection pipe, the grouting pipe and the water injection pipe are closed; and S4. the transverse pressing plate and the longitudinal pressing plate are turned on after slurry setting to test strength and record monitoring data, and the influence of temperature, water quality, grouting pressure, water pressure and water flow on grouting water blocking is analyzed.

Wherein, the specific operations of the test device are that the test box 2 is loaded with crushed rocks having a maximum grain size of not more than 50 mm through the top movable cover plate and the connected longitudinal pressing plate 14, the amount of loaded rocks is more than three quarters of the volume of the test box 2, and the test box 2 is tightly connected with the cover plate by a strong magnetic strip, and the connection portion is covered with an insulation layer; the solution of $Cl^-$ at 0-2.50 mol/L or $SO_4^{2-}$ at 0-2.50 mol/L is prepared, the aqueous solution is poured into the solution box 1, and the concentration value is recorded; the valve 10 on the water drain pipe 21 is opened, the valve 10 on the water injection pipe 34 is opened, the test box 2 is filled with water by the water pump 7 through the water injection pipe 34 at a set water pressure, the flow rate of the water injection pipe 34 is kept constant at a set water flow rate, and the unused water injection holes 33 are plugged with corks; the test box 2 is subjected to temperature increase, and the temperature increase is stopped after the set temperature is reached; the valve 10 on one or more liquid injection pipes 9 is opened, and the unused liquid injection holes 12 are plugged, simultaneously the valve 10 on the grouting pipe 17 is opened for grouting, the slurry is injected into the crushed rocks in the test box 2 by the grouting pump 3 at a set grouting pressure until no water flows out from the water drain pipe 21, i.e., the flow meter 20 on the water drain pipe 21 indicates zero, the grouting is stopped, and the valves 10 on the liquid injection pipe 9, the grouting pipe 17 and the water injection pipe 34 are closed, the time from the start of grouting to the end of grouting is recorded; the shorter the time, the better the water blocking effect; after the slurry has set, the transverse pressing plate 23 and the longitudinal pressing plate 14 are turned on to test its strength and record the data; the influence of temperature, water quality, different grouting pressures, water pressures and water flows on the grouting water blocking effect is investigated, the higher the strength, the better the water blocking effect. After the test is completed, the solution box 1 is cleaned, the cover plate is opened, and the test box 2 is cleaned, and the cover plate is installed after the test box 2 is dried, and the connection portion is covered with an insulation layer.

On the one hand, the device and the method can test the influence of the single or multi-factor coupling of temperature, water quality, fracture width, angle and roughness on the performance of the grouting material, and on the other hand, the device and the method can test the influence of the single or multi-factor coupling of temperature, water quality, water pressure, water flow and grouting pressure on the grouting effect, so as to reveal the influence law of different conditions on grouting material performance and grouting effect, and can be widely applied to the technical field of coal mine grouting water blocking research. In addition, the above test method has the advantages of reasonable design and simple operation.

Of course, the above description is not intended to limit the present invention, and the present invention is not limited to the above examples. Changes, modifications, additions or substitutions made by those skilled in the art within the substantive scope of the present invention should also fall within the scope of protection of the present invention.

What is claimed:

1. A rock stratum grouting water blocking test device under a mining coupling condition, comprising a solution box, a test box, a pressing plate replacement box, a grouting pump, a recovery pool and a water pump, wherein the solution box is connected with the test box through a liquid injection pipe, the bottom of the test box is connected with the pressing plate replacement box, the pressing plate replacement box is connected with a bottom plate, and the bottom plate is connected with a control panel; longitudinal pressing plates, a transverse pressing plate, and a temperature sensor, a weight sensor and a stress sensor are provided inside the test box; the longitudinal pressing plate at the bottom of the test box is provided with fracture and scales, a top of the test box is provided with a cover plate, and the cover plate is provided with a plurality of liquid injection holes, one or more of liquid injection holes are connected with the solution box through the liquid injection pipe; a left side panel of the test box is provided with a water drain hole and a plurality of grouting holes, and a right side panel is provided with a plurality of water injection holes, and the water injection holes are connected with the water pump through a water injection pipe; the water drain hole is connected with a recovery pool through a water drain pipe, and one or more of grouting holes are connected with the grouting pump through a grouting pipe;

a pressure gauge is installed on the grouting pipe, each of the water drain pipe and the water injection pipe is provided with a water pressure gauge and a flow meter; each of the liquid injection pipe, the grouting pipe, the water drain pipe, and the water injection pipe is provided with a valve;

the longitudinal pressing plate is provided with a plurality of opening holes, and the positions of the opening holes are opposite to the positions of the liquid injection holes in the cover plate; the middle of the cover plate is provided with a hydraulic prop which connects the cover plate with the longitudinal pressing plate; and the longitudinal pressing plate is rotated by means of a roller, a width of the fracture is adjusted to be 1-3.5 mm, an angle of the fracture is adjusted to be 0°-50°, and a roughness factor of the fracture is adjusted to be JRC=8-10, 14-16, 18-20.

2. The rock stratum grouting water blocking test device under a mining coupling condition according to claim 1, wherein the weight sensor is arranged at a central position of the longitudinal pressing plate at the bottom of the test box, the longitudinal pressing plate is connected with a rotatable roller via a connecting bolt, the rotatable roller is provided with a groove; the temperature sensor is disposed inside the test box.

3. The rock stratum grouting water blocking test device under a mining coupling condition according to claim 1, wherein the test box and the pressing plate replacement box are peripherally coated with an insulation layer, and the pressing plate replacement box is provided with a box door.

4. A diffusion test method for a grouting material, using the rock stratum grouting water blocking test device under the mining coupling condition according to claim 1, comprising the steps of:

S1. preparing a cement-based inorganic grouting slurry, and stirring to be uniform;

S2. removing the longitudinal pressing plate inside the test box, mounting a stainless steel glass plate;

S3. after plugging a part of the grouting holes with corks, using the grouting pump to inject the slurry into the test box via the grouting holes through the grouting pipe;

S4. stopping grouting when the slurry is level with the fractures of the longitudinal pressing plate on the top of the pressing plate replacement box;

S5. after heating the test box to a set temperature, opening the valve on the water drain pipe, rotating the longitudinal pressing plate above the pressing plate replacement box, and after rotating to a set angle, observing the diffusion law of the grouting material;

S6. opening the pressing plate replacement box and cleaning the longitudinal pressing plate; and S7. replacing the longitudinal pressing plate above the pressing plate replacement box, setting the temperature, the fracture angle, the fracture width, and the fracture roughness, and repeating the steps S1-S6 to observe the diffusion law of the grouting material, respectively.

5. A method of measuring the strength of a grouting material using the rock stratum grouting water blocking test device under the mining coupling condition according to claim 1, comprising the steps of:

S1. preparing a cement-based inorganic grouting slurry, and stirring to be uniform;

S2. after setting the fracture angle, the fracture width, and the fracture roughness, and plugging a part of the grouting holes with corks, using the grouting pump to inject the slurry into the test box in layers via the grouting holes through the grouting pipe, and tamping each layer after grouting is completed;

S3. stopping grouting when the amount of the injected slurry is greater than three quarters of the volume of the test box, keeping the valves on the water drain pipe and the water injection pipe in a closed state;

S4. preparing a solution containing $Cl^-$ or $SO_4^{2-}$, recording the concentration value after pouring the solution into the solution box;

S5. after initial setting of the slurry and after plugging a part of the liquid injection holes with corks, opening the valve on one or more of liquid injection pipes, and performing a partial or whole leaching experiment;

S6. after adjusting the temperature of the test box to a set temperature, turning on the transverse pressing plate and the longitudinal pressing plate; and S7. analyzing the influence of temperature and water quality on the strength of the grouting material.

* * * * *